United States Patent
Huebler

(10) Patent No.: US 6,945,238 B2
(45) Date of Patent: Sep. 20, 2005

(54) AIR INTAKE ARRANGEMENT FOR AN INTERNAL COMBUSTION ENGINE

(75) Inventor: Mark Steven Huebler, Shelby Township, Macomb County, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/887,746

(22) Filed: Jul. 8, 2004

(65) Prior Publication Data

US 2005/0072409 A1 Apr. 7, 2005

Related U.S. Application Data

(60) Provisional application No. 60/508,583, filed on Oct. 3, 2003.

(51) Int. Cl.[7] ............................................... F02B 47/08

(52) U.S. Cl. ................................................ 123/568.18

(58) Field of Search ...................... 123/568.18, 568.15, 123/568.17, 302, 306, 308, 432

(56) References Cited

U.S. PATENT DOCUMENTS

| 6,092,512 A | * | 7/2000 | Ma ........................ 123/568.15 |
| 6,167,865 B1 | * | 1/2001 | Ma ............................ 123/308 |
| 6,705,267 B1 | * | 3/2004 | Westerbeke et al. ... 123/184.53 |

* cited by examiner

*Primary Examiner*—Mahmoud Gimie
(74) *Attorney, Agent, or Firm*—Kathryn A. Marra

(57) ABSTRACT

An air intake system for an internal combustion engine includes a conduit defining a passageway that conveys air to a manifold. An EGR inlet in the conduit enables EGR to mix with the air. A plate is sufficiently positioned in the passageway such that air in the passageway is divided into two streams. One of the streams flows on one side of the plate and the other stream flows on the other side of the plate. The plate is sufficiently positioned with respect to the EGR inlet such that at least some of the EGR, and preferably the greater part of the EGR entering the passageway, is diverted to flow on only one side of the plate. The plate deflects at least some of the EGR such that it has more time and space in which to mix with the air before being ingested in an engine cylinder. The plate thus enables more consistent EGR distribution among engine cylinders, resulting in better emissions and fuel economy compared to the prior art.

6 Claims, 2 Drawing Sheets

AIR INTAKE ARRANGEMENT FOR AN INTERNAL COMBUSTION ENGINE

CROSS REFERENCE TO RELATED APPLICATION

This application claims the benefit of U.S. patent application Ser. No. 60/508,583, filed Oct. 3, 2003, which is hereby incorporated by reference in its entirety.

TECHNICAL FIELD

This invention relates to air intake systems for internal combustion engines that include a passageway for supplying air to a manifold; an EGR inlet whereby EGR enters the passageway with the air; and a plate dividing the passageway such that at least some of the EGR is diverted by the plate to flow on only one side of the plate.

BACKGROUND OF THE INVENTION

The use of an exhaust gas recirculation system to recirculate internal combustion engine exhaust gas (EGR) to an inlet air path of an engine is well known. EGR can lower the level of certain undesirable engine emission components such as nitrogen oxide (NOx) and can improve fuel economy. Up to a limit, NOx emissions decrease with increasing EGR levels. Beyond the limit, EGR can increase formation of other undesirable engine emission components and can reduce vehicle drivability.

Exhaust gas recirculation typically involves recirculation of exhaust gas through an EGR passage between an engine exhaust conduit and an engine fresh air intake passage. A valve within the EGR passage (the EGR valve) is controlled to vary a restriction within the EGR passage to regulate the flow of exhaust gas therethrough. When EGR is not required, the EGR valve is driven to a full restriction (closed) position, typically through a spring preload. The spring preload is commonly required to be substantial, to ensure rapid closing of the EGR valve when necessary, and to ensure proper sealing of a closed EGR valve. When EGR is required, the EGR valve is driven to an open position through application of a position control signal to an actuator mechanically linked to the EGR valve. The degree of opening of the EGR valve varies with the magnitude of the position control signal.

When the EGR valve is open, EGR enters the fresh air intake passage and flows to the engine cylinders. For optimum performance, the EGR should mix thoroughly with the fresh air so that each cylinder receives substantially identical proportions of fresh air and EGR. Typically, the EGR is added to the fresh air immediately prior to entering an intake manifold to minimize the response time between a signal commanding the EGR valve to open and EGR reaching the engine cylinders.

SUMMARY OF THE INVENTION

An air intake system for an engine includes a conduit that defines a passageway configured to convey air from the atmosphere to an intake manifold during engine operation. The conduit includes an EGR inlet configured to selectively supply EGR to the passageway. A plate having a first side and a second side divides the passageway into a first volume at least partially formed by the first side and a second volume at least partially formed by the second side.

The plate and the EGR inlet are sufficiently positioned with respect to one another such that at least a portion of the EGR from the EGR inlet flows through the first volume along the first side of the plate, and air flows through both the first and second volumes along the first side and the second side, respectively, during operation of the engine. The plate forces the EGR in the first volume to a portion of the manifold chamber such that it has more time to mix with air, resulting in more consistent EGR distribution among engine cylinders.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
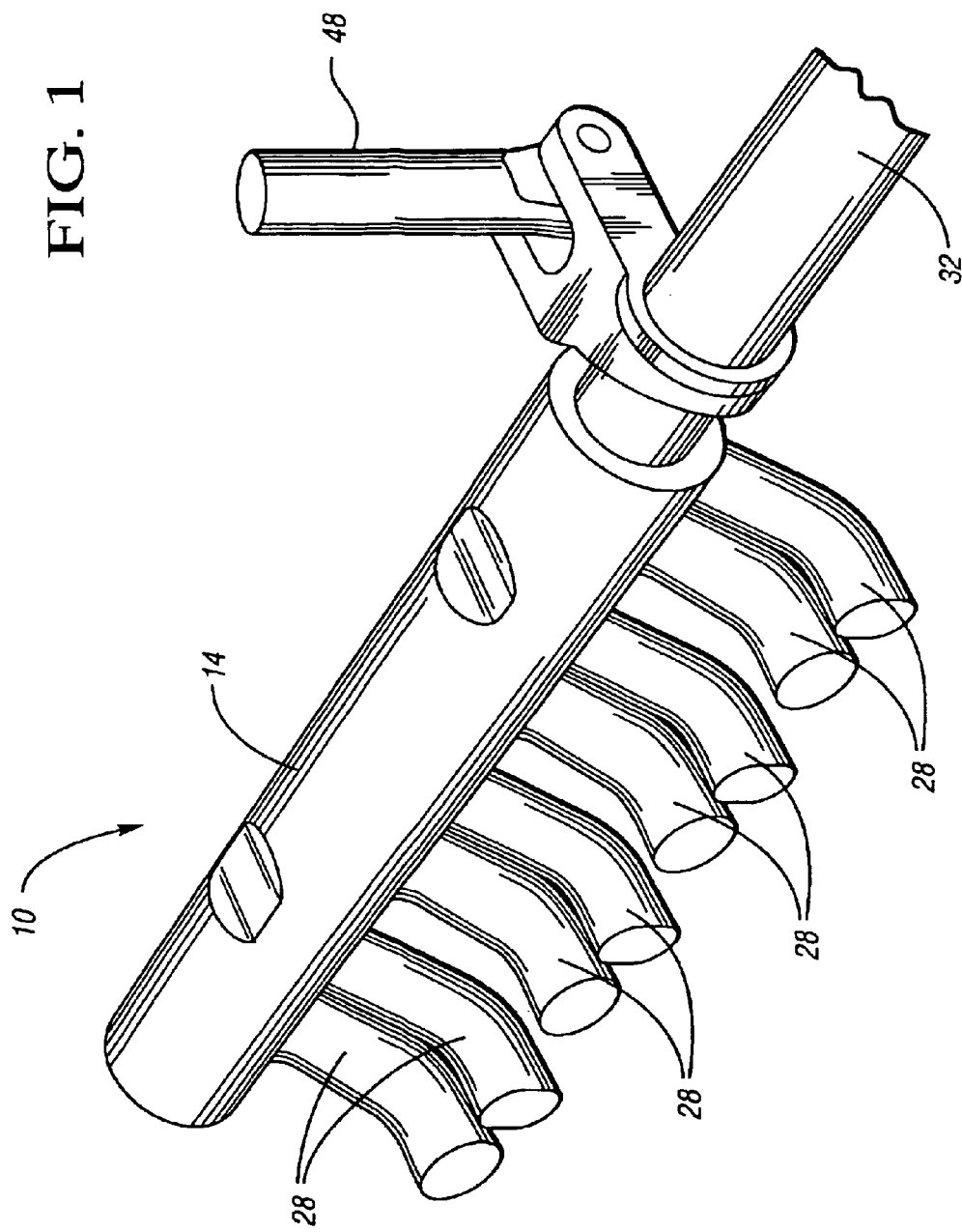
FIG. 1 is a schematic perspective view of an air intake system, including a manifold, runner, conduit, and EGR tube.
Figure 2:
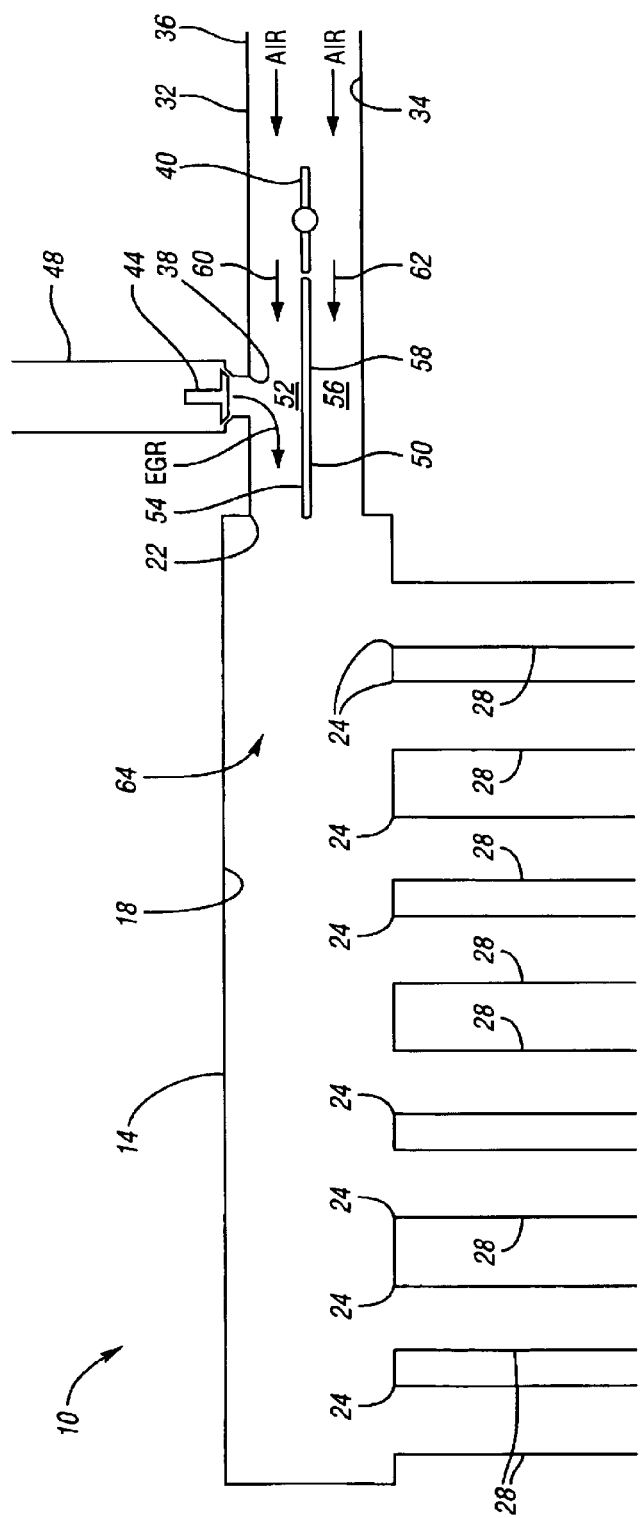
FIG. 2 is a schematic side sectional view of the air intake system of FIG. 1 (FIG. 2 is not drawn to scale).

Referring to FIGS. 1 and 2, an air intake system 10 for an internal combustion engine is schematically depicted. The air intake system 10 distributes combustion gases, including fresh air and recirculated exhaust gas (EGR), to a plurality of engine cylinders (not shown). The air intake system 10 includes an air intake manifold 14. The air intake manifold 14 in the embodiment depicted is a log style manifold 14, i.e., a substantially cylindrical, elongated member. Exemplary manifold configurations are described in U.S. Pat. No. 4,549,506, issued Oct. 29, 1985 to Rush II et al, which is hereby incorporated by reference in its entirety.

The manifold 14 defines an elongated, generally cylindrical chamber 18 having a manifold gas inlet 22 at one end through which gas flows into the chamber 18. The air intake manifold 14 also defines a plurality of gas outlets 24 through which gas flows from the chamber 18 to the engine cylinders via runners 28. The gas outlets 24 and runners 28 are distributed along the length of the manifold 14; thus, the distance between the inlet 22 and any one of the outlets 24 is different from the distance between the inlet 22 and any of the other outlets 24.

The runners 28 are connected to inlet ports (not shown) formed in a cylinder head (not shown), as understood by those skilled in the art. Camshaft-operated intake valves (not shown) open to allow gas to flow from the runners 28 to the engine cylinders during respective intake strokes, and close to prevent fluid communication between cylinders and the runners 28 during respective compression, power, and exhaust strokes. The air intake system 10 depicted is configured for an engine that employs two intake valves per cylinder. Accordingly, each cylinder is in fluid communication with the chamber 18 via two runners 28: a primary runner and a secondary runner. However, within the scope of the claimed invention, the air intake system may have only one runner per cylinder.

The air intake system 10 may be employed with any internal combustion engine. A fuel injection system is preferably employed to inject fuel vapor into the runners 28 when the air intake system 10 is employed with a spark-ignition engine.

The manifold 14 is preferably constructed of a lightweight, high temperature thermoplastic such as polyamide 66 (nylon 66). However, within the scope of the claimed invention, the intake manifold 14 material need not be limited to a plastic material but may also include traditional materials such as steel, aluminum, magnesium, etc.

A conduit 32, being a zip tube in the present embodiment, defines a passageway 34. The passageway 34 is sufficiently exposed to the atmosphere at one end 36, typically through a filter (not shown), for drawing air into the passageway 34, i.e., the passageway is in fluid communication with the atmosphere. The conduit 32 also defines an EGR inlet 38 proximate to the gas inlet 22. The conduit 32 is connected to the gas inlet 22 so that the passageway 34 is in fluid communication with the chamber 18. Thus, the passageway 34 is configured to convey gas, including at least air and EGR, into the chamber 18 during operation of the engine. A throttle plate 40 regulates the flow rate of fresh air from the atmosphere, and an EGR valve 44 regulates the flow rate of EGR. The EGR valve is selectively activated by an engine control module (not shown). Traditional EGR supply systems include a steel tube 48 encased in an insulating material (not shown) to protect surrounding componentry.

A plate 50 within the conduit 32 divides the passageway 34 into an upper volume 52 partially defined by a first side 54 of the plate 50, and a lower volume 56 partially defined by a second side 58 of the plate 50. The upper volume 52 and the lower volume 56 define separate channels within the passageway 34. The plate 50 may or may not be a unitary part of the conduit within the scope of the claimed invention. The plate divides air flowing through the passageway 34 during engine operation into two streams: a first stream 60 flows through the upper volume 52 along the first side 54 of the plate 50, and a second stream 62 flows through the lower volume 56 along the second side 58 of the plate 50. In the embodiment depicted, the plate 50 is sufficiently positioned with respect to the EGR inlet 38 such that EGR enters the passageway 34 on only one side 54 of the plate 50. However, depending on the configuration of the air intake system 10, it may be desirable for a small percentage of EGR to flow on the other side 58 of the plate. To accomplish this, the plate 50 may be positioned downstream with respect to the EGR inlet 38, or a second EGR inlet (not shown) may direct a small amount of EGR to flow on the other side 58 of the plate 50.

The plate 50 deflects, or directs, the EGR flowing through the upper volume 52 along the first side 54 to the upper portion 64 of the manifold chamber 18 such that it has more time and space in which to mix with air prior to entering the runners 28 via the outlets 24, resulting in more consistent EGR distribution among the engine cylinders. Without the plate 50 deflecting the EGR, the EGR may, in some cases, have a tendency to flow to the outlet 24 nearest the inlet 22. The plate 50 is preferably positioned to minimize its effect on the flow of fresh air in the passageway 34 for maximum volumetric efficiency.

While the best mode for carrying out the invention has been described in detail, those familiar with the art to which this invention relates will recognize various alternative designs and embodiments for practicing the invention within the scope of the appended claims.

What is claimed is:

1. An air intake system for an engine, the air intake system comprising:

a conduit defining a passageway configured to convey air from the atmosphere to an intake manifold during operation of the engine, the conduit defining an EGR inlet configured as a source of EGR into the passageway; and a plate having a first side and a second side, the plate dividing the passageway into a first volume at least partially defined by the first side and a second volume at least partially defined by the second side;

wherein the plate and the EGR inlet are sufficiently positioned such that at least a portion of the EGR from the EGR inlet flows through the first volume along the first side of the plate, and air flows through both the first and second volumes along the first side and the second side, respectively, during operation of the engine.

2. The air intake system of claim 1, wherein the EGR inlet and the plate are sufficiently positioned such that at least a majority of the EGR from the EGR inlet flows through the first volume along the first side of the plate during at least a portion of engine operation.

3. The air intake system of claim 2, further comprising the intake manifold, and wherein the manifold defines an elongated chamber in fluid communication with the passageway.

4. The air intake system of claim 3, wherein the manifold defines a gas inlet at one end of the manifold and at which the conduit is connected; and wherein the manifold defines a plurality of outlets distributed along the length of the manifold and in fluid communication with the chamber.

5. An air intake system for an internal combustion engine, the air intake system comprising:

a manifold defining a generally cylindrical chamber;

a conduit defining a passageway that is operatively connected to the manifold, and in fluid communication with one end of the chamber, one end of the conduit being in fluid communication with the atmosphere such that air is drawn into the chamber via the passageway during operation of the engine;

a plurality of runners spaced apart from one another along the length of the chamber such that each runner is a different distance from the conduit;

a plate within the conduit that divides the passageway such that air flow, through the passageway on both sides of the plate; and wherein the conduit defines EGR inlet sufficiently positioned with respect to the plate such that at least some of the EGR flows on only one side of the plate.

6. An air intake arrangement for an engine, the air intake arrangement comprising:

a zip tube configured to convey air from the atmosphere to an intake manifold during operation of the engine, the zip tube defining an EGR inlet configured as a source of EGR into the zip tube; and a plate having a first side and a second side, the plate dividing the zip tube into a first volume at least partially defined by the first side and a second volume at least partially defined by the second side;

wherein the plate and the EGR inlet arc sufficiently positioned such that at least a portion of the EGR from the EGR inlet flows through the first volume along the first side of the plate, and air flows through both the first and second volumes along the first side and the second side, respectively, during operation of the engine.

* * * * *